(12) United States Patent
Amir et al.

(10) Patent No.: US 11,254,322 B2
(45) Date of Patent: Feb. 22, 2022

(54) SYSTEM AND METHOD FOR MONITORING AND MANAGING COGNITIVE LOAD OF AN OCCUPANT OF A VEHICLE

(71) Applicant: Intuition Robotics, Ltd., Ramat-Gan (IL)

(72) Inventors: Roy Amir, Mikhmoret (IL); Itai Mendelsohn, Tel Aviv-Jaffa (IL); Dor Skuler, Oranit (IL); Shay Zweig, Harel (IL)

(73) Assignee: Intuition Robotics, Ltd., Ramat-Gan (IL)

( * ) Notice: Subject to any disclaimer, the term of this patent is extended or adjusted under 35 U.S.C. 154(b) by 176 days.

(21) Appl. No.: 16/737,235

(22) Filed: Jan. 8, 2020

(65) Prior Publication Data

US 2020/0216082 A1    Jul. 9, 2020

Related U.S. Application Data

(60) Provisional application No. 62/789,741, filed on Jan. 8, 2019.

(51) Int. Cl.
| | |
|---|---|
| *B60W 50/00* | (2006.01) |
| *B60W 40/08* | (2012.01) |
| *B60W 60/00* | (2020.01) |
| *G05B 13/02* | (2006.01) |

(52) U.S. Cl.
CPC ........ *B60W 50/0098* (2013.01); *B60W 40/08* (2013.01); *B60W 60/001* (2020.02); *G05B 13/0265* (2013.01)

(58) Field of Classification Search
USPC .......................................................... 701/24
See application file for complete search history.

(56) References Cited

U.S. PATENT DOCUMENTS

| | | | | |
|---|---|---|---|---|
| 2017/0329329 A1* | 11/2017 | Kamhi | ................. | G05D 1/0061 |
| 2019/0359056 A1* | 11/2019 | Wilson | ................ | B60W 60/007 |
| 2020/0216082 A1* | 7/2020 | Amir | .................... | B60W 60/001 |

* cited by examiner

*Primary Examiner* — Tyler D Paige
(74) *Attorney, Agent, or Firm* — M&B IP Analysts, LLC

(57) ABSTRACT

A system and method for monitoring and managing a cognitive load of an occupant of a vehicle, including: determining, based on analysis of a first set of sensory inputs received from a first set of sensors from a cabin of the vehicle, a current cognitive load score of an occupant of the vehicle; determining, based on an analysis of a second set of sensory inputs, a current state of the vehicle; analyzing the current cognitive load score of the occupant with respect to the current state of the vehicle; and, selecting at least one predetermined plan for execution based on a determination that a reduction of the current cognitive load score of the occupant is desirable, wherein the determination is based on a result of the analysis of the current cognitive load score of the occupant and the current state of the vehicle.

15 Claims, 4 Drawing Sheets

SYSTEM AND METHOD FOR MONITORING AND MANAGING COGNITIVE LOAD OF AN OCCUPANT OF A VEHICLE

CROSS-REFERENCE TO RELATED APPLICATIONS

This application claims the benefit of U.S. Provisional Application No. 62/789,741 filed on Jan. 8, 2019, the contents of which are hereby incorporated by reference.

TECHNICAL FIELD

The present disclosure relates generally to measuring cognitive load, and more specifically to a system and method for monitoring and managing cognitive load of an occupant of a vehicle.

BACKGROUND

The field of autonomous driving is growing and an increasing rate, with many options related to fully autonomous vehicles, semi-autonomous or partially autonomous vehicles, and the like, becoming available to end consumers for the first time. Many related novel features are being introduced in conventional vehicles as well, such as lane assist and rear end collision prevention technologies. These features range from a simple informative alert, such as an icon notification of the presence of a vehicle in a blind spot, to fully autonomous driving of a vehicle when a user needs only to sit back in their seat and watch a car take them from a point of origin to their destination without any human input.

Many passengers in such vehicles are, and will be, unfamiliar with the manner in which these vehicles are configured to operate. While an occupant of an autonomous vehicle may grow dependent on the technologies used to control the vehicle without use input, under certain circumstances user attention is still required. The amount of attention demanded varies depending on specific scenarios. Thus, it is imperative to remind an individual using an autonomous vehicle that increased attention and focus is required depending on certain internal and external circumstances, e.g., rainy weather or loud music which may significantly distract the individual. Determining how much initial focus and cognitive load is required of a user of such a vehicle, in addition to anticipating changes in required focus, is a challenging task to successfully determine.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for monitoring and managing a cognitive load of an occupant of a vehicle, including: determining, based on analysis of a first set of sensory inputs received from a first set of sensors from within a cabin of the vehicle, a current cognitive load score of at least one occupant of the vehicle; determining, based on an analysis of a second set of sensory inputs, a current state of the vehicle; analyzing the current cognitive load score of the at least one occupant with respect to the current state of the vehicle; and, selecting at least one predetermined plan for execution based on a determination that a reduction of the current cognitive load score of the at least one occupant is desirable, wherein the determination is based on a result of the analysis of the current cognitive load score of the at least one occupant and the current state of the vehicle.

Certain embodiments disclosed herein also include a non-transitory computer readable medium having stored thereon instructions for causing a processing circuitry to perform a process, the process including: determining, based on analysis of a first set of sensory inputs received from a first set of sensors from within a cabin of a vehicle, a current cognitive load score of at least one occupant of the vehicle; determining, based on an analysis of a second set of sensory inputs, a current state of the vehicle; analyzing the current cognitive load score of the at least one occupant with respect to the current state of the vehicle; and, selecting at least one predetermined plan for execution based on a determination that a reduction of the current cognitive load score of the at least one occupant is desirable, wherein the determination is based on a result of the analysis of the current cognitive load score of the at least one occupant and the current state of the vehicle.

Certain embodiments disclosed herein also include a system for monitoring and managing a cognitive load of an occupant of a vehicle, comprising: a processing circuitry; and a memory, the memory containing instructions that, when executed by the processing circuitry, configure the system to: determine, based on analysis of a first set of sensory inputs received from a first set of sensors from within a cabin of the vehicle, a current cognitive load score of at least one occupant of the vehicle; determine, based on an analysis of a second set of sensory inputs, a current state of the vehicle; analyze the current cognitive load score of the at least one occupant with respect to the current state of the vehicle; and, select at least one predetermined plan for execution based on a determination that a reduction of the current cognitive load score of the at least one occupant is desirable, wherein the determination is based on a result of the analysis of the current cognitive load score of the at least one occupant and the current state of the vehicle.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
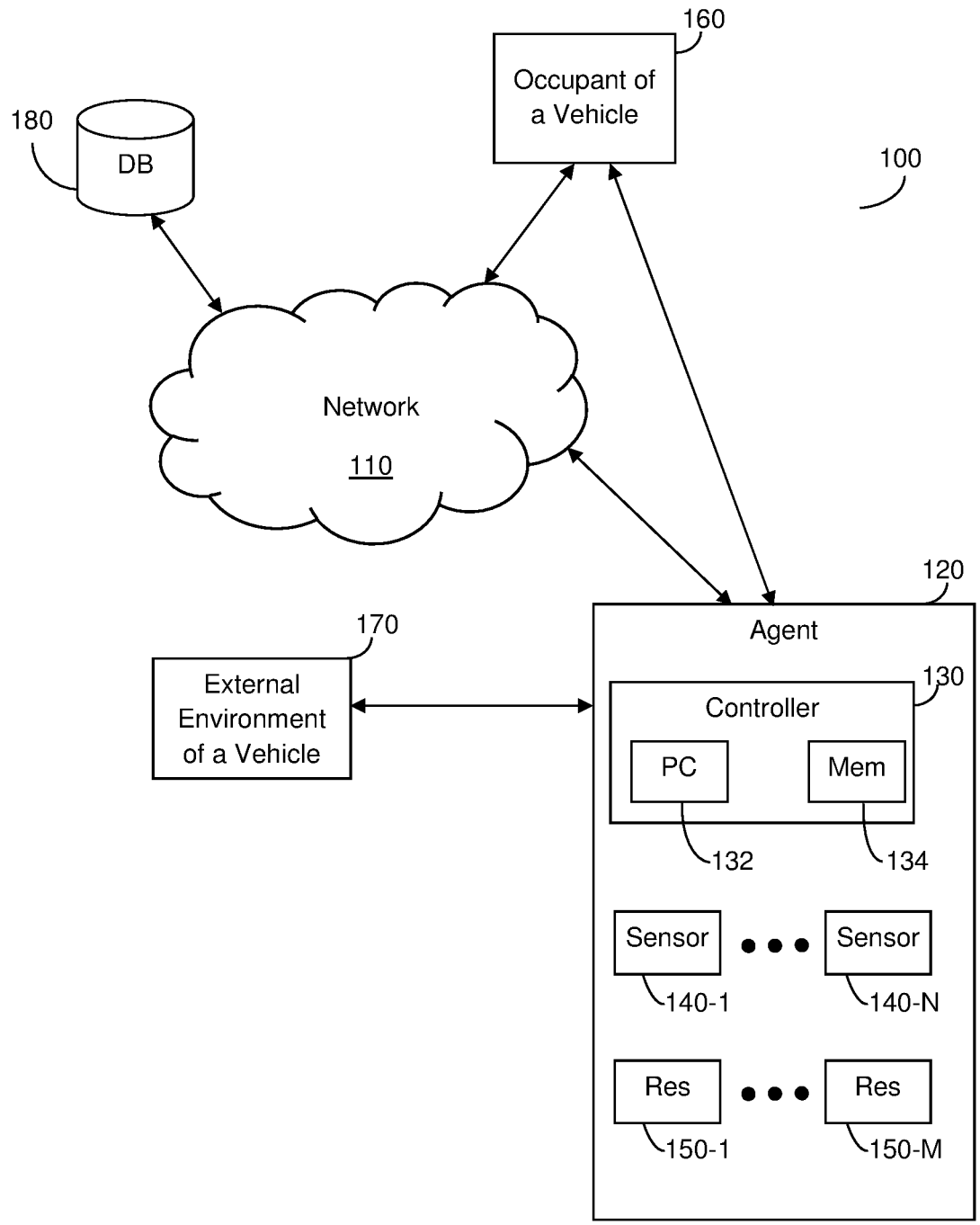
FIG. 1 is a network diagram of a system utilized for monitoring and managing cognitive load of an occupant of a vehicle according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is a network diagram of a system 100 according to an embodiment. The system 100 includes an agent 120, an occupant 160 of a vehicle and external environment of a vehicle 170. In some embodiments, the agent 120 is further connected to a network, where the network 110 is used to communicate between different parts of the system 100. The network 110 may be, but is not limited to, a local area network (LAN), a wide area network (WAN), a metro area network (MAN), the Internet, a wireless, cellular or wired network, and the like, and any combination thereof.

The occupant 160 may be, for example, a driver of a vehicle (not shown), a potential driver who sits in front of a steering wheel of a vehicle that may be able to take control of the vehicle when needed, and the like. The vehicle may be a fully autonomous vehicle, semi-autonomous vehicle, traditional vehicle, an aerial vehicle, a vessel, a combination thereof, and so on. The occupant 160 may access the agent 120 directly, e.g., via a voice command or an input device connected directly to the agent 120, or indirectly through the network 110, e.g., through an application on a mobile phone connected to the internet, where the agent is additionally connected to the internet.

The agent 120 includes a controller 130, explained in more detail below in FIG. 2, having at least a processing circuitry 132 and a memory 134. The agent 120 further includes or is directly connected to one or more sensors 140-1 to 140-N, where N is an integer equal to or greater than 1 (hereinafter referred to as sensor 140 or sensors 140 merely for simplicity) and one or more resources 150-1 to 150-M, where M is an integer equal to or greater than 1 (hereinafter referred to as resource 150 or resources 150 merely for simplicity).

The sensors 140 may include input devices, such as various sensors, detectors, microphones, touch sensors, movement detectors, cameras, and the like. Any of the sensors 140 may be connected to the controller 130 (such a connection is not illustrated in FIG. 1 merely for the sake of simplicity and without limitation on the disclosed embodiments). The sensors 140 may be configured to sense signals received from within a cabin of the vehicle. A first set of sensory inputs may be associated with a single occupant that sits alone within the cabin, multiple occupants within the cabin, and so on. The first set of sensory inputs may be indicative of the state within the cabin. The state within the cabin may include, for example, a loud interaction within the cabin between two out of three total occupants in the cabin, where the two are identified as children and the third occupant is identified as an adult. To that end, the sensors may be positioned inside the vehicle's cabin. The sensors 140 may also be configured to detect signals received from outside the vehicle indicating the state of the external environment. To that end, the sensors may be positioned on an external part of the vehicle. In an embodiment, the sensors 140 refer to both internal and external sensors relative to the vehicle.

The resources 150 may include display units, audio speakers, lighting system, and the like. In an embodiment, the resources 150 may encompass sensors 140 as well. As a non-limiting example, the resources 150 include a vehicle's sound system, a display unit, a head-up display (HUD), and so on. In an embodiment, the resources 150 may also include parts of the vehicle such as windows, trunk, windshield wipers, and so on.

According to another embodiment, the agent 120 may have a direct link to the controller area network (CAN) bus (not shown) of the vehicle as well as the autonomous system (not shown) for receiving inputs and executing at least one plan as further described herein below. For example, the agent 120 may receive signals indicating the battery is drained or there is an engine malfunction from the CAN bus. As another example, the agent 120 may send a signal to the CAN bus to switch the windshield wipers on. The agent 120 may receive a signal from the autonomous system of the vehicle indicating a decision to slow down the vehicle. According to the last example, the agent 120 may be configured to generate and send a command to the autonomous system, e.g., to slow down the vehicle.

The agent 120 is configured to use the controller 130, the sensors 140, and the resources 150 in order to monitor and manage a cognitive load of the occupant 160 as further described herein below. Cognitive load refers to the mental effort being used by the occupant, e.g., where the occupant is concentrating on one or more tasks such as reading a book, texting, talking on the phone, writing an email, interacting with the agent 120, and the like. In an embodiment, the agent 120 may include hardware, software, a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause a processing circuitry to perform the various processes described herein.

In one embodiment, the system 100 further includes a database 180. The database may be stored within the agent 120 (e.g., within a storage device not shown), or may be separate from the agent 120 and connected thereto via the network 110. The database 180 may store one or more plans to be executed, using the resources 150, based on a determination that the cognitive load of the occupant 160 is relatively high with respect to the current state of the external environment, as further discussed herein below.

According to another embodiment, the database 180 may have stored therein historical data associated with the occupant 160. The historical data may be retrieved from the database 180 and used to determine, for example, the most effective way for using the resources 150 for a specific identified occupant 160.

Figure 2:
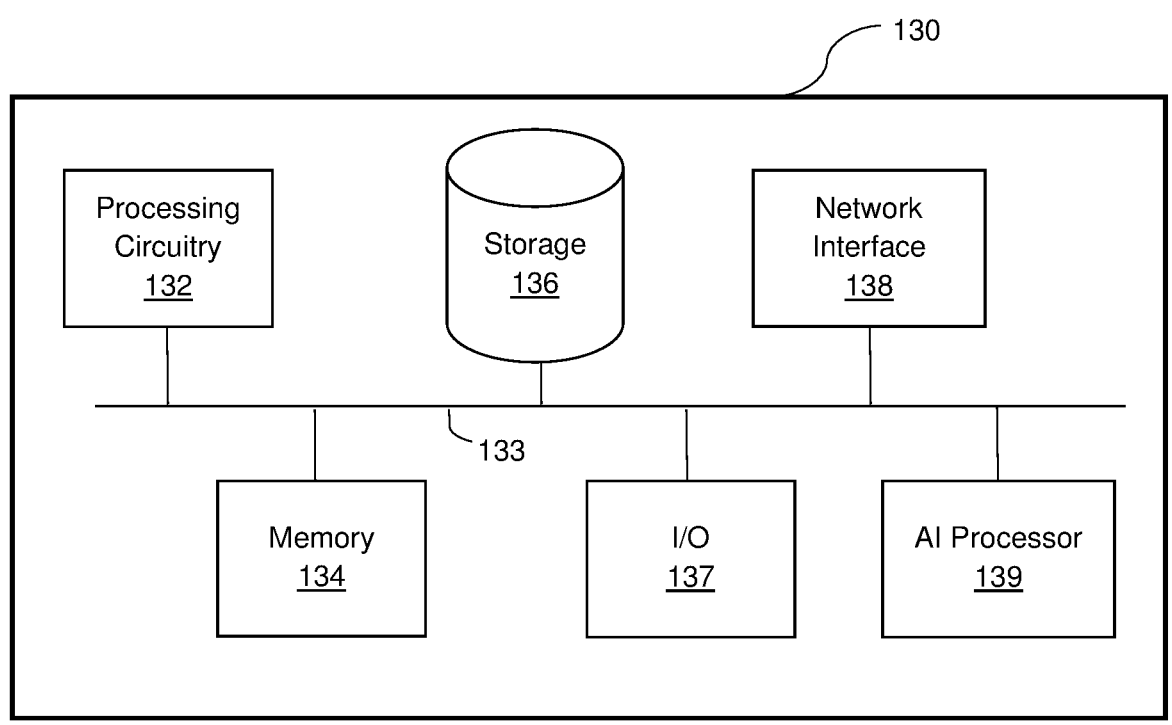
FIG. 2 is a block diagram of a controller according to an embodiment.

FIG. 2 shows an example schematic block diagram of a controller 130 of an agent, e.g., the agent 120 of FIG. 1, according to an embodiment. The controller 130 includes a processing circuitry 132 configured to receive data, analyze data, generate outputs, and the like, as further described herein below. The processing circuitry 132 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The controller 130 further includes a memory 134. The memory 134 may contain therein instructions that, when executed by the processing circuitry 132, cause the controller 130 to execute actions as further described herein below. The memory 134 may further store therein information, e.g., data associated with predetermined plans that may be executed by one or more resources, e.g., resources 150 of FIG. 1. As discussed above, the resources 150 include means by which the agent 120, interacts with at least one occupant 160, collects data related to the occupant 160, and the like. For example, the resources 150 may be sensors, electro-mechanical elements, display units, speakers, and so on as further described herein.

In an embodiment, the controller 130 includes a network interface 138 configured to connect to a network, e.g., the network 110 of FIG. 1. The network interface 138 may include, but is not limited to, a wired interface (e.g., an Ethernet port) or a wireless port (e.g., an 802.11 compliant Wi-Fi card) configured to connect to a network (not shown).

The controller 130 further includes an input/output (I/O) interface 137 configured to connect to and control the resources 150 of the agent 120. The resources 150 may include, for example, electro-mechanical elements, sensors, detectors, display units, speakers, microphones, touch sensors, light sensors, movement detectors, cameras, and the like. In an embodiment, the I/O interface 137 is configured to receive one or more signals captured by sensors 140 of the agent 120 and send them to the processing circuitry 132 for analysis. According to one embodiment the I/O interface 137 is configured to analyze the signals captured by the sensors 140, detectors, and the like. According to a further embodiment, the I/O interface 137 is configured to send one or more commands to one or more of the resources 150 for executing one or more plans or capabilities of the agent 120.

A plan may include for example, an active action such as generating a notification on the head-up display (HUD) of the vehicle. The plan may also include a passive action, e.g., by preventing the generation of new interactions that may be initiated by the agent 120 or other systems of the vehicle with the occupant 160, when reduction of the cognitive load of the occupant 160, or maintaining a low cognitive load, is desirable. The reduction of the cognitive load of the occupant 160 may be desirable when, for example, the external environment state may require increased cognitive load, e.g., a high response time of the occupant 160. According to a further embodiment, the components of the controller 130 are connected via a bus 133.

The controller 130 further includes an artificial intelligence (AI) processor 139. The AI processor 139 may be realized as one or more hardware logic components and circuits, including graphics processing units (GPUs), tensor processing units (TPUs), neural processing units, vision processing unit (VPU), reconfigurable field-programmable gate arrays (FPGA), and the like. The AI processor 139 is configured to perform machine learning based on sensory inputs received from the I/O unit 137, which receives the sensory inputs from the sensors 140. In an embodiment, the AI processor 139 is further configured to determine, based on one or more machine learning models, the current state within the cabin of the vehicle, the current state of one or more occupants of the vehicle, e.g., the occupant 160, the current cognitive load of the occupant 160, the current state of the external environment outside the vehicle, and so on. In an embodiment, the AI processor 139 is further configured to select one or more predetermined plans to be executed when the cognitive load of the occupant 160 is relatively high with respect to the current state of the external environment.

In an embodiment, the controller 130 is configured to receive, from a first set of sensors, e.g. the sensors 140 of FIG. 1, that collect sensory inputs from a vehicle's cabin, a first set of sensory inputs. The first set of sensory inputs may indicate on a current state within the cabin of the vehicle, the current state of one or more occupants of the vehicle, and the like. The first set of sensors may be part of the vehicle's sensors, designated sensors of the agent 120, and so on. The first set of sensors, e.g., the sensors 140, may be positioned within the cabin of the vehicle, in proximity to the cabin, directed to the cabin, and so on, such that sensory inputs can be detected. The current state of one or more occupants, e.g., the occupants 160, may be reading a book, texting, talking on the phone, looking at the view outside the vehicle, and the like, while the vehicle, e.g., an autonomous vehicle, is navigating through city streets. The state within the cabin may include, for example, a conversation between four occupants.

The controller 130 is configured to analyze the first set of sensory inputs. The analysis may be achieved using, for example and without limitations, one or more machine learning techniques, computer vision techniques, and the like.

The controller 130 may be configured to determine, based on analysis of the first set of sensory inputs, using for example, at least one machine learning technique, a current cognitive load score of at least one occupant of the vehicle, e.g., the occupant 160. The current cognitive load score of the occupant 160 may be determined based on an action the occupant 160 is currently performing, the state within the cabin of the vehicle, the interaction between the occupant 160 and the agent 120 or other systems of the vehicle, a combination thereof, and so on. For example, if the occupant is talking on the phone and simultaneously writing an email, the cognitive load score may be relatively high. According to another example, if the occupant 160 just sits quietly and look straight through the vehicle's windshield, the cognitive load score may be relatively low.

According to another embodiment, the determination of the current cognitive load score of the occupant 160 may further include analyzing interaction data between the agent 120 and the occupant 160. Interaction data refers to the information that is associated with a current interaction between the occupant and the agent 120, an upcoming interaction between the occupant and the agent 120, and so on. That is, in some cases the agent 120 may initiate interaction with the occupant 160, for example, to update the occupant 160 regarding a weather forecast, ask questions regarding the preferred destination, and the like. This interaction may distract the occupant's attention and may increase the cognitive load score. Thus, the interaction with the agent 120 may also affect the cognitive load score of the occupant 160. In an embodiment, the controller 130 may determine that an interaction that is supposed to be executed by the agent 120, shall not be executed due to a relatively high current cognitive load score of the occupant 160 as further discussed in FIG. 4.

The controller 130 may be configured to receive, from a second set of sensors, e.g., the sensors 140-2 (not shown), a second set of sensory inputs. The second set of sensors, that may include at least one of the first set of sensors, may be designed to collect sensory inputs from an external environment of the vehicle, from an internal environment of the vehicle, and so on. The second set of sensory inputs may be indicative of a current state of the external environment of the vehicle, and a current state of the internal environment of the vehicle. The second set of sensors may be part of the vehicle's sensors, designated sensors of the agent 120, and the like. The second set of sensors may be positioned outside the vehicle, directed to the external environment that surrounds the vehicle, and they may also be positioned inside the vehicle directed to the cabin and, for example, the other occupants.

The second set of sensory inputs may be indicative of, for example, a crowded crosswalk, the distance between the vehicle and a group of people, a ball that rolls toward the vehicle path, a baby that fell asleep in the back seat of the vehicle, and so on. It should be noted that the agent 120 may collect data indicating the state of the vehicle, state of the road, speed limit, signs, objects identification, number of occupants within the cabin, and the like, directly from at least one controller of the vehicle (not shown). In an embodiment, the controller 130 may be configured to obtain additional information, such as for example, the weather forecast. The additional information may be collected from, for example, the Internet.

The controller 130 may be configured to analyze the second set of sensory inputs. The analysis may be achieved using, for example and without limitations, one or more computer vision techniques, audio signal processing techniques, machine learning techniques, and the like.

In an embodiment, the controller 130 is configured to determine, based on analysis of the second set of sensory inputs using, for example, at least one machine learning technique, the current state of the internal and external environment of the vehicle. For example, the current state of the external environment may be clear, without any detected obstacles. Alternatively, the external environment state may indicate a large number of children standing next to a crosswalk, and that two of the children are running after each other next to the road, and the like. The internal environment state may be indicative of, for example, two babies asleep in the back seat of the vehicle.

The current state of the internal and the external environment of the vehicle may also be associated with a score indicating the level of attention needed from the occupant 160. For example, the highest score of the internal and the external environment state may be 5, indicating that, e.g., there is a high probability that the occupant may be required to take control on the vehicle. The highest score may also be indicative of a very short response time may be needed within seconds, and therefore it may be desirable to reduce the cognitive load of the occupant if it the cognitive load of the occupant is currently relatively high with respect to the external environment state.

The controller 130 may be configured to analyze the determined current cognitive load score of the occupant 160 with respect to the current state of the internal and the external environment of the vehicle. The analysis may be achieved using, for example, a machine learning algorithm, a predetermined set of rules, and the like. The predetermined set of rules may include a plurality of rules that may state that, for example, if the vehicle's speed is above 30 miles an hour, the vehicle is getting close to a school, and the occupant cognitive load score is, for example, above 2 out of 5, a plan designed to reduce the cognitive load score and draw the attention of the occupant 160, may be selected and executed as further described herein below.

The controller 130 may be configured to select at least one plan for execution based on the result of the analysis of the cognitive load score of the occupant 160 and the current state of the internal and the external environment of the vehicle. The purpose of the automatic selection and execution of one or more plans is to reduce the cognitive load of the occupant 160 when it is desirable to do so. The plan may be selected from a plurality of predetermined plans that may be stored in a database, e.g., the database 180. The selected plan may include for example, turning down the volume of the vehicle's sound system, generating an indication on the head-up display (HUD) of the vehicle, stopping other interactions that may be distractive, and so on.

As further discussed herein above, a plan may also include a passive action, e.g., deciding to prevent the generation of new interactions the agent 120 may have been configured to generate. Such interactions may be executed by the agent 120 or other systems of the vehicle. The selection and execution of a plan may occur when the cognitive load score is determined to be relatively high with respect to the scenario outside the vehicle. For example, the cognitive load score may be determined to be high when the occupant 160 is, for example, reading a book, while simultaneously eating and listening to loud music. According to the same example, if vehicle approaches a crosswalk full of children, a plan that turns down the music, generates a sound, emits a red light on the HUD, or a combination of the above, may be selected and generated by the agent 120. According to another example, if the cognitive load score is, again, high, however, this time the current state of the external environment of the vehicle indicates that the road is clear, and no obstacles were detected, no plan will be executed. It should be noted that when it is not desirable to reduce the cognitive load score of the occupant, no plan will be selected.

According to another example, the current state of the external environment of the vehicle indicates an accident occurred on the highway 100 meters ahead. However, the cognitive load score is very low, which means that, for example, the occupant 160 is not doing anything else except looking straight ahead through the windshield, a corresponding plan that reflects the occupant's awareness may be selected, or no plan is selected at all if the occupant is well aware to the circumstances in a high certainty level. According to the same example, a different plan may be selected if the cognitive load score of the occupant 160 was higher.

Figure 3:
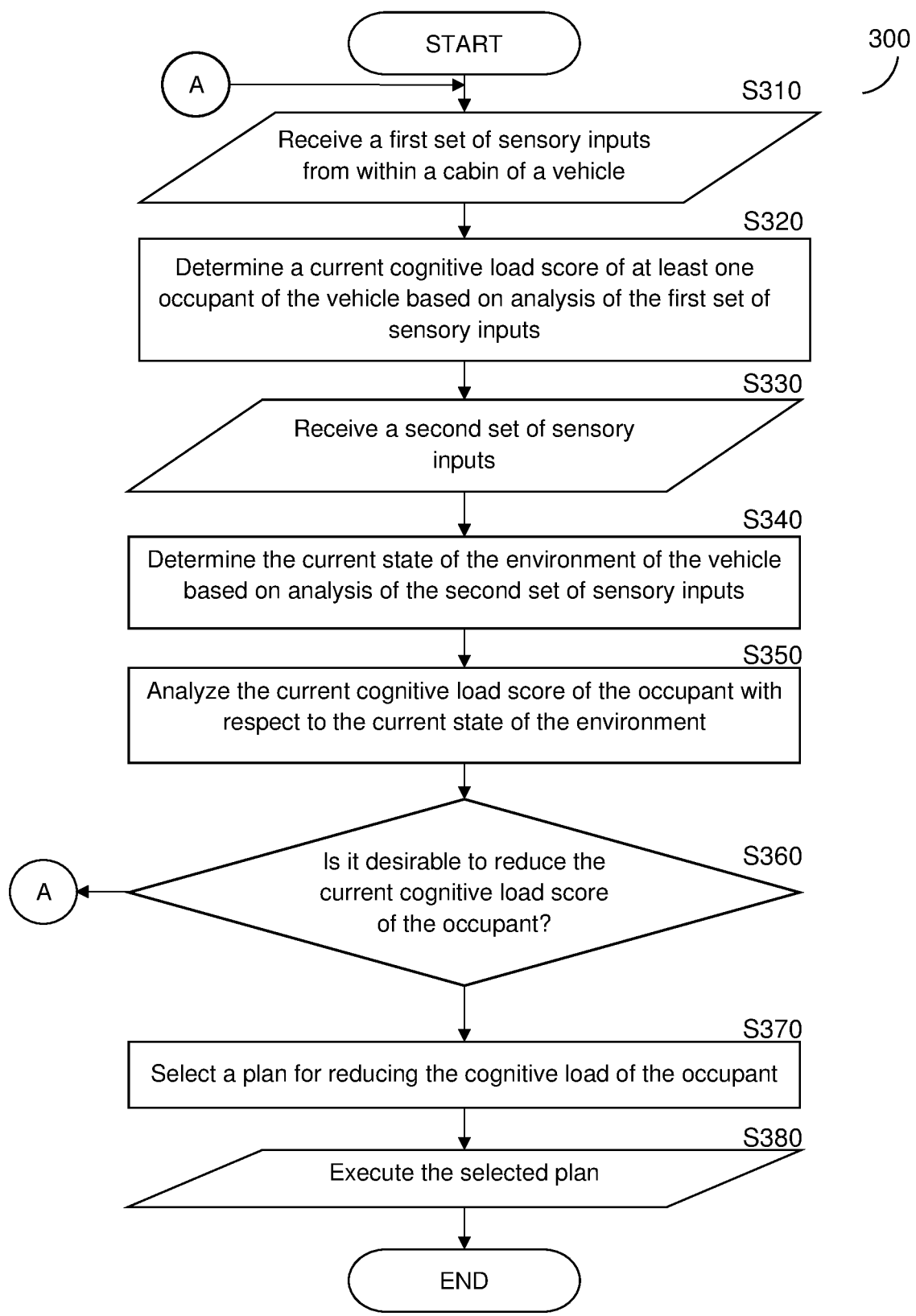
FIG. 3 is a flowchart illustrating a method for monitoring and managing cognitive load of an occupant of a vehicle according to an embodiment.

FIG. 3 shows an example flowchart 300 illustrating a method for monitoring and managing cognitive load of an occupant of a vehicle according to an embodiment.

At S310, a first set of sensory inputs is received from a first set of sensors that collect sensory inputs from a vehicle's cabin. The first set of sensory inputs may be indicative of, for example, a current state within the cabin of the vehicle, at least one occupant, e.g., the occupant, the interaction between the occupants of the vehicle, the interaction between one or more occupants with the agent or other systems of the vehicle, and the like. In an embodiment, the determination of the current cognitive load score of the occupant may further include analyzing interaction data that is received from the interaction between the occupant and the agent, other systems of the vehicle, and so on.

At S320, a current cognitive load score of the occupant is determined based on analysis of the first set of sensory inputs. The analysis may be achieved using, for example, computer vision technique. The determination of the current cognitive load score of the occupant may be achieved using, for example, at least one machine learning technique.

At S330, a second set of sensory inputs is received from a second set of sensors that collect sensory inputs from the internal and external environment of the vehicle. The second set of sensory inputs, when analyzed, is indicative of the current state of the internal and external environment of the vehicle. Further, at S330 additional information may be obtained, such as for example, a weather forecast. The additional information may be collected from, for example, the Internet.

At S340, the current state of the internal and external environment of the vehicle is determined based on an analysis of the second set of sensory inputs. The determination of the current state of the internal and external environment of the vehicle may be achieved using, for example, at least one machine learning technique.

At S350, the current cognitive load score of the occupant is analyzed with respect to the current state of the internal and external environment of the vehicle. The analysis may be achieved using, for example, a machine learning algorithm, a predetermined set of rules, and the like. In an embodiment, the machine learning algorithm includes implementation of one or more neural networks, recurrent neural networks, decision tree learning, Bayesian networks, clustering, and the like, based on the sensory inputs.

At S360, it is determined whether a reduction of the current cognitive load score of the occupant is desirable and if so, execution continues with S370; otherwise, execution continues with S310.

The determination is based on the analysis of the current cognitive load score of the occupant and the current state of the internal and external environment of the vehicle. The determination may be achieved using at least one machine learning technique, e.g., the machine learning algorithms discusses above. In an embodiment, upon determination that the cognitive load score of the occupant is low enough, which means that the occupant is not distracted, with respect to the current state of the internal and external environment of the vehicle, the controller may select a plan that is adapted to such scenarios, e.g., a plan that prevents intervention of the agent for preventing distractions.

At S370, at least one predetermined plan is selected based on determination that reduction of the current cognitive load score of the occupant is desirable. The selection may be made out of a plurality of predetermined plans that were previously stored in a database, e.g., the database 180. At S380, the selected plan is executed using one or more resources, e.g., the resources 150 (shown in FIG. 1). The resources may be for example a vehicle's sound system, vehicle's display unit, head-up display (HUD), and so on.

Figure 4:
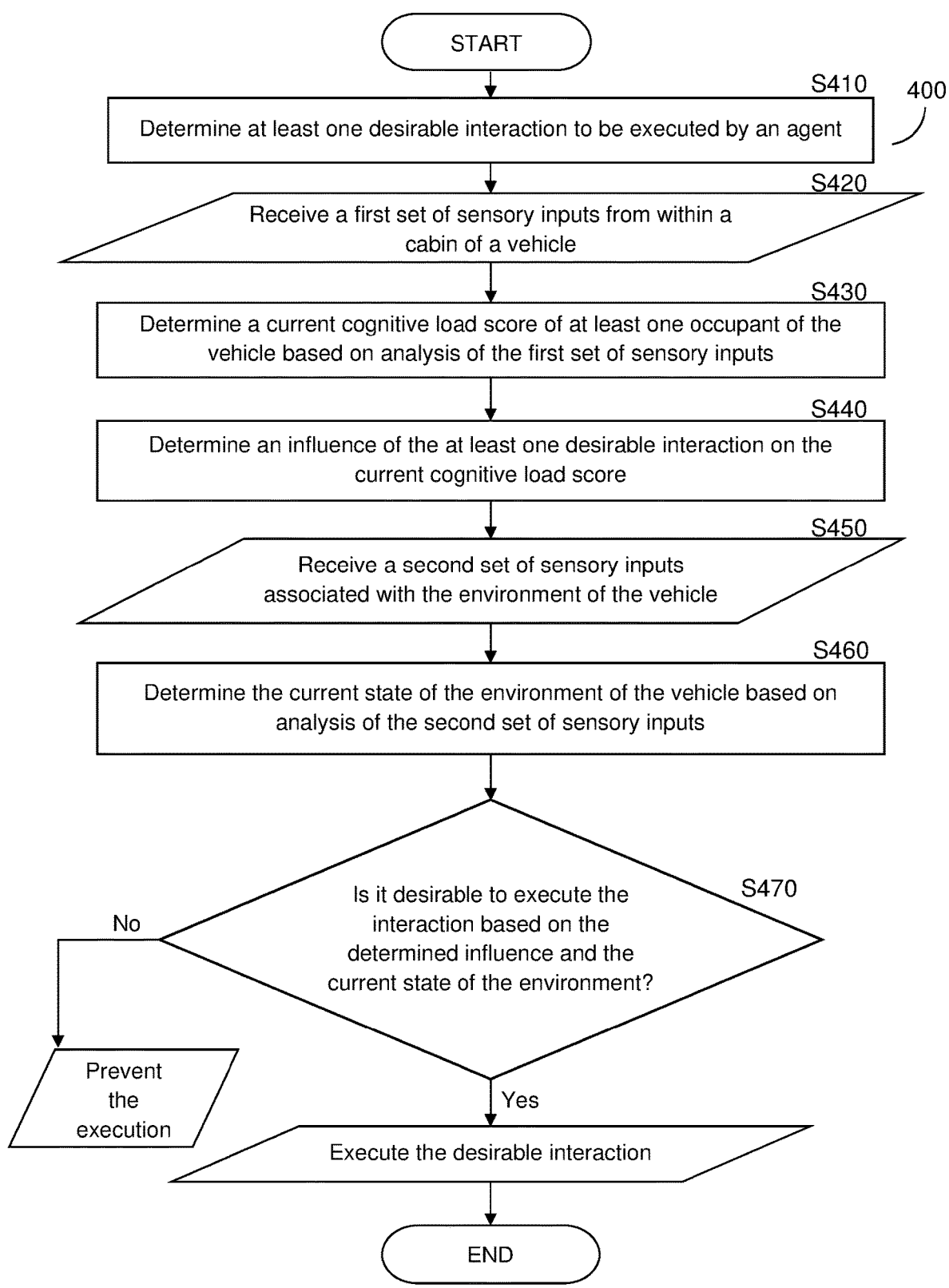
FIG. 4 is a flowchart illustrating a method for monitoring and managing interactions executed by an agent that is connected to a controller of a vehicle based on a cognitive load of an occupant of the vehicle according to an embodiment.

FIG. 4 is an example flowchart 400 illustrating a method for monitoring and managing interactions executed by an agent that is communicatively connected to a controller of a vehicle based on a cognitive load of an occupant of the vehicle according to an embodiment.

At S410, at least one desirable interaction to be executed by the agent, e.g., the agent shown in FIG. 1, is determined. A desirable interaction is a proactive communication program. The proactive communication program may be desirable in several scenarios, such as when the agent determines that rain is about to start and the occupant should be informed, when the vehicle is about to change lanes, and the like.

At S420, a first set of sensory inputs is received from a first set of sensors that collect sensory inputs from a vehicle's cabin. The first set of sensory inputs may be indicative of, for example, a current state within the cabin of the vehicle, at least one occupant, the interaction between the occupants of the vehicle, the interaction between one or more occupants with the agent or other systems of the vehicle, and the like. In an embodiment, the determination of the current cognitive load score of the occupant may further include analyzing interaction data that is received from the interaction between the occupant and the agent, other systems of the vehicle, and the like.

At S430, a current cognitive load score of the occupant is determined based on an analysis of the first set of sensory inputs. The analysis may be achieved using, for example, computer vision technique. The determination of the current cognitive load score of the occupant may be achieved using, for example, at least one machine learning technique.

At S440, an influence of the at least one desirable interaction on the current cognitive load score is determined. The influence may be, reducing the cognitive load score, increasing the cognitive load score. In an embodiment, the desirable interaction may have no influence on the current cognitive load score.

At S450, a second set of sensory inputs is received from a second set of sensors that collect sensory inputs from the internal and external environment of the vehicle. The second set of sensory inputs, when analyzed, is indicative of the current state of the internal and external environment of the vehicle. At S450, additional information may be obtained, such as for example, a weather forecast. The additional information may be collected from, e.g., the Internet.

At S460, the current state of the internal and external environment of the vehicle is determined based on an analysis of the second set of sensory inputs. The determination of the current state of the internal and external environment of the vehicle may be achieved using, for example, at least one machine learning technique.

At S470, it is determined whether it is desirable to execute the determined interaction based on the determined influence and the current state of the environment and if so, execution continues with S480; otherwise, execution continues with S475. For example, if the current cognitive load score is 3 out of 5, and the vehicle is getting close to a school area, a desirable interaction that suggests watching a lecture may increase the cognitive load score to 4 out 5, which may be undesirable as it may be distractive with respect to the circumstances, and therefore should be prevented.

At S475, upon determination that it is not desirable to execute the interaction the execution is prevented.

At S480, upon determination that it is desirable to execute the interaction, the interaction is executed.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for monitoring and managing a cognitive load of an occupant of a vehicle, comprising:
    analyzing an interaction data between an agent of the vehicle and the at least one occupant, wherein the interaction data includes data relating to an upcoming interaction between the least one occupant of the vehicle and the agent;
    determining, based on analysis of a first set of sensory inputs received from a first set of sensors from within a cabin of the vehicle, and based on the analysis of the interaction data, a current cognitive load score of at least one occupant of the vehicle, wherein the cognitive load defines a mental effort required by the occupant to perform at least one task, and wherein the first set of sensory inputs are at least indicative of a current state within the cabin;
    determining, based on an analysis of a second set of sensory inputs, a current state of the vehicle;
    analyzing the current cognitive load score of the at least one occupant of the vehicle with respect to the current state of the vehicle; and
    selecting at least one predetermined plan for execution when a reduction of the current cognitive load score of the at least one occupant is desirable, wherein the determination is based on a result of the analysis of the current cognitive load score of the at least one occupant and the current state of the vehicle, wherein the plan causes execution of an action by the agent of the vehicle.

2. The method of claim 1, wherein the current state of the vehicle includes at least one of: a current state of an external environment of the vehicle and a current state of an internal environment of the vehicle.

3. The method of claim 2, wherein the current state of the external environment of the vehicle is determined using at least one machine learning technique.

4. The method of claim 1, wherein the analysis of the first set of sensory inputs further comprises at least one computer vision technique.

5. The method of claim 1, wherein the determination of the current cognitive load score of the at least one occupant is achieved using at least one machine learning technique.

6. The method of claim 5, wherein the at least one machine learning technique includes at least one of: one or more neural networks, recurrent neural networks, decision tree learning, Bayesian networks, and clustering.

7. The method of claim 1, wherein the analysis of the second set of sensory inputs further comprises at least one computer vision technique.

8. A non-transitory computer readable medium having stored thereon instructions for causing a processing circuitry to perform a process, the process comprising:
    analyzing an interaction data between an agent of the vehicle and the at least one occupant, wherein the interaction data includes data relating to an upcoming interaction between the least one occupant of the vehicle and the agent;
    determining, based on analysis of a first set of sensory inputs received from a first set of sensors from within a cabin of a vehicle, and based on the analysis of the interaction data, a current cognitive load score of at least one occupant of the vehicle, wherein the cognitive load defines a mental effort required by the occupant to perform at least one task, and wherein the first set of sensory inputs are at least indicative of a current state within the cabin;
    determining, based on an analysis of a second set of sensory inputs, a current state of the vehicle;
    analyzing the current cognitive load score of the at least one occupant of the vehicle with respect to the current state of the vehicle; and
    selecting at least one predetermined plan for execution when a reduction of the current cognitive load score of the at least one occupant is desirable, wherein the determination is based on a result of the analysis of the current cognitive load score of the at least one occupant and the current state of the vehicle, wherein the plan causes execution of an action by the agent of the vehicle.

9. A system for monitoring and managing a cognitive load of an occupant of a vehicle, comprising:
    a processing circuitry; and
    a memory, the memory containing instructions that, when executed by the processing circuitry, configure the system to:
    analyze an interaction data between an agent of the vehicle and the at least one occupant, wherein the interaction data includes data relating to an upcoming interaction between the least one occupant of the vehicle and the agent;
    determine, based on analysis of a first set of sensory inputs received from a first set of sensors from within a cabin of the vehicle, and based on the analysis of the interaction data, a current cognitive load score of at least one occupant of the vehicle, wherein the cognitive load defines a mental effort required by the occupant to perform at least one task, and wherein the first set of sensory inputs are at least indicative of a current state within the cabin;

determine, based on an analysis of a second set of sensory inputs, a current state of the vehicle;

analyze the current cognitive load score of the at least one occupant of the vehicle with respect to the current state of the vehicle; and select at least one predetermined plan for execution when a reduction of the current cognitive load score of the at least one occupant is desirable, wherein the determination is based on a result of the analysis of the current cognitive load score of the at least one occupant and the current state of the vehicle, wherein the plan causes execution of an action by the agent of the vehicle.

10. The system of claim 9, wherein the current state of the vehicle includes at least one of: a current state of an external environment of the vehicle and a current state of an internal environment of the vehicle.

11. The system of claim 10, wherein the current state of the external environment of the vehicle is determined using at least one machine learning technique.

12. The system of claim 9, wherein the analysis of the first set of sensory inputs further comprises at least one computer vision technique.

13. The system of claim 9, wherein the determination of the current cognitive load score of the at least one occupant is achieved using at least one machine learning technique.

14. The system of claim 13, wherein the at least one machine learning technique includes at least one of: one or more neural networks, recurrent neural networks, decision tree learning, Bayesian networks, and clustering.

15. The system of claim 9, wherein the analysis of the second set of sensory inputs further comprises at least one computer vision technique.

* * * * *